United States Patent
Amirian (10) Patent No.: US 10,696,259 B2
(45) Date of Patent: Jun. 30, 2020

(54) PEDAL ASSEMBLY FOR A MOTOR VEHICLE

(71) Applicant: CJ Automotive AB, Dalstorp (SE)

(72) Inventor: Mahdi Amirian, Borås (SE)

(73) Assignee: CJ Automotive AB, Dalstorp (SE)

( * ) Notice: Subject to any disclaimer, the term of this patent is extended or adjusted under 35 U.S.C. 154(b) by 0 days.

(21) Appl. No.: 16/445,276

(22) Filed: Jun. 19, 2019

(65) Prior Publication Data

US 2020/0017054 A1  Jan. 16, 2020

(30) Foreign Application Priority Data

Jul. 10, 2018 (SE) ...................................... 1850876

(51) Int. Cl.
  *B60R 21/09* (2006.01)
  *G05G 1/32* (2008.04)
  *B60T 7/06* (2006.01)

(52) U.S. Cl.
  CPC ............... *B60R 21/09* (2013.01); *G05G 1/32* (2013.01); *B60T 7/065* (2013.01)

(58) Field of Classification Search
  CPC ............ B60R 21/09; G05G 1/32; B60T 7/065
  See application file for complete search history.

(56) References Cited

U.S. PATENT DOCUMENTS

| 7,240,581 B2 * | 7/2007 | Lee ........................... G05G 1/30 180/271 |
| 7,665,387 B2 * | 2/2010 | Park ........................ B60R 21/09 180/271 |
| 8,973,462 B2 * | 3/2015 | Olajos .................... G05G 1/327 74/512 |
| 9,889,826 B2 * | 2/2018 | Periasamy ................ B60T 7/06 |
| 2004/0159176 A1 | 8/2004 | Ji |

(Continued)

FOREIGN PATENT DOCUMENTS

| EP | 1247710 A1 | 10/2002 |
| EP | 1600344 A1 | 11/2005 |

(Continued)

OTHER PUBLICATIONS

European Search Report (Nov. 15, 2019) for corresponding European App. EP 19 17 1642.

*Primary Examiner* — Vicky A Johnson
(74) *Attorney, Agent, or Firm* — WRB-IP LLP (57) ABSTRACT

A pedal assembly for a motor vehicle includes a pedal arm pivotably arranged about a rotation shaft at its first end when in an operating position. A bracket is rotatably arranged around the rotation shaft and connected to the first end of the pedal arm through a pedal connection shaft. A locking arrangement, when in a locked state, locks the bracket in a first bracket position relative the pedal arm such that the bracket rotates with the pedal arm, and the pedal arm is held in an operating position. When the locking arrangement changes from the locked state to an unlocked state, the bracket is unlocked from the pedal arm such that, under influence of gravity, the pedal arm is released from the rotation shaft and displaced from the operating position to a safety position, the first end of the pedal arm being connected to the rotation shaft via the pedal connection shaft and the bracket, and the bracket rotated relative the pedal arm to a second bracket position.

13 Claims, 8 Drawing Sheets

(56) References Cited

U.S. PATENT DOCUMENTS

| | | |
|---|---|---|
| 2007/0137394 A1 | 6/2007 | Park |
| 2007/0227289 A1 | 10/2007 | Choi et al. |
| 2010/0043592 A1 | 2/2010 | Johansson |
| 2013/0000440 A1 | 1/2013 | Bushong |
| 2013/0087010 A1* | 4/2013 | Kapocs ............... B60T 7/065 74/560 |
| 2014/0260766 A1* | 9/2014 | Sukonthapanich .... G05G 1/327 74/512 |
| 2015/0168986 A1* | 6/2015 | Kim ................. G05G 1/30 74/512 |

FOREIGN PATENT DOCUMENTS

| | | |
|---|---|---|
| EP | 1709505 B1 | 10/2008 |
| EP | 2578454 B1 | 12/2014 |
| EP | 3239801 A1 | 11/2017 |
| ES | 2308925 A1 | 12/2008 |
| WO | 03045750 A1 | 6/2003 |
| WO | 2014092621 A1 | 6/2014 |

* cited by examiner

PEDAL ASSEMBLY FOR A MOTOR VEHICLE

BACKGROUND AND SUMMARY

The disclosure is related to a pedal assembly for a motor vehicle designed to allow a displacement of a pedal arm of the pedal assembly from an operating position to a safety position in the event of a collision.

Different kinds of safety arrangements for motor vehicle pedals are known, wherein the pedal is allowed to move forward relative to the driving direction of the vehicle, in the event of a collision, thereby minimizing injuries of the driver's feet if the pedal structure moves towards the driver upon a collision.

In EP 2 578 454 B1 is described one such pedal safety arrangement. This safety arrangement comprises a pedal structure and a pedal hub for transferring a movement of the pedal structure to the vehicular system. The pedal structure comprises a pedal arm and a bracket fixedly connected to the pedal arm. The pedal structure is in a first position relative to the pedal hub during normal operation of the pedal structure. The pedal structure can, in the event of a collision, be displaced from the first position to a second position relative the pedal hub and in this second position the pedal structure is at least partly operatively decoupled from the pedal hub. When the pedal structure is in the second position, braking is still possible at a reduced stroke.

In EP 1 709 505 B1 is shown another pedal safety arrangement for a motor vehicle. The safety arrangement comprises a pedal support with a bracket which is secured in a bulkhead disposed in the vehicle between the passenger compartment of the vehicle and the engine room. A first shaft is secured in the bracket, horizontal and transversely directed in relation to the direction of travel of the vehicle, and a pedal arm provided with a footplate is pivotally arranged about the first shaft. An operating device is pivotally arranged in the pedal arm at a distance from the first shaft for maneuvering or controlling a vehicle function, e.g. braking. The first shaft, when in a normal position in the bracket, is locked by means of a locking device. In the event of a collision the locking device is openable for permitting displacement of the first shaft in the direction of travel of the vehicle to a safety position where the footplate is displaced away from the legs/feet of the vehicle driver but where the function of the operating device is at least partly retained.

Both above described pedal safety arrangements are quite space consuming, why it would be desirable with an alternative pedal safety arrangement which is more flexible and with less space requirements.

It is desirable to provide a pedal assembly which is more flexible than known solutions. It is also desirable to provide a pedal assembly which is less space consuming than known solutions. The invention is defined by the appended independent claims.

According to a first aspect there is provided a pedal assembly for a motor vehicle, comprising an elongated pedal arm having a first end and a second end comprising a pedal plate, wherein when the pedal arm is in an operating position the pedal arm is pivotably arranged about a rotation shaft at its first end, and a bracket, which is rotatably arranged around the rotation shaft and connected to the first end of the pedal arm through a pedal connection shaft. The pedal assembly further comprises a locking arrangement configured to, when in a locked state, lock the bracket in a first bracket position relative the pedal arm such that the bracket rotates with the pedal arm when the pedal arm pivots about the rotation shaft, and the pedal arm is held in the operating position. When the locking arrangement is changing from the locked state to an unlocked state, the bracket is unlocked from the pedal arm such that, under influence of gravity, the pedal arm is released form the rotation shaft and displaced from the operating position to a safety position, wherein the first end of the pedal arm is connected to the rotation shaft via the pedal connection shaft and the bracket, and the bracket is rotated relative the pedal arm about the rotation shaft and the pedal connection shaft in a direction substantially opposite to a direction of displacement of the second end of the pedal arm when the pedal arm is displaced from the operating position to the safety position to a second bracket position relative the pedal arm.

The pedal assembly may e.g. be a brake pedal assembly or a clutch pedal assembly. The rotation shaft around which the pedal arm in the operating position is pivotable and the bracket is rotatable may be a rotation hub connected to the chassis of the vehicle.

That the second end of the pedal arm is held in an operating position by the locking arrangement when in a locked state is here meant that the pedal arm is positioned for normal use, e.g. braking or clutching, through pressing of the pedal plate with the driver's foot. In the locked state, the bracket is fixed relative the pedal arm and does not rotate relative the pedal arm but rotates with the pivoting pedal arm.

The safety position is a position where the second end of the pedal arm and the pedal plate have been displaced away from the legs/feet of the vehicle driver as compared to when in the operating position, e.g. in the event of a collision or if a collision is about to occur. Thereby injuries to the driver's feet may be avoided or reduced if the pedal assembly moves towards the driver upon a collision.

The parts of the pedal assembly mainly involved when the pedal arm in case of e.g. a collision is moved from the operating position to the safety position are all arranged at the first end of the pedal arm, i.e. the bracket and the locking arrangement. Hence, this part of the pedal assembly may be made compact, not requiring a large space in a vehicle. Thereby, space is freed along the pedal arm for connection to e.g. an operating device for activating or controlling a vehicular function, such as a breaking function, a clutching function or the like. The present pedal assembly being flexible by allowing for pedal arm-operating device connections of different geometries. Further, by arranging the bracket and the locking arrangement at the first end of the pedal arm according to an aspect of the invention it is possible to use the present solution together with pedal arms of large geometric differences. Consequently, the same produced bracket and locking arrangement can be used for different pedal arms which results in larger productions series and in the end a more cost-efficient pedal assembly.

When the locking arrangement is changed from the locked state to an unlocked state, the bracket is unlocked from the pedal arm, such that, under influence of gravity, the pedal arm is released from the rotation shaft and displaced from the operating position to a safety position, wherein the first end of the pedal arm is connected to the rotation shaft via the pedal connection shaft and the bracket. The first end of the pedal arm is released from the rotation shaft when the locking arrangement is changed from the locked state to the unlocked state and the pedal arm is displaced from the operating position to the safety position, such that the pedal arm is no longer pivotable directly about the rotation shaft. When the locking arrangement is changed from the locked state to the unlocked state the bracket is rotated relative the pedal arm about the rotation shaft and the pedal connection shaft in a direction substantially opposite to the direction of displacement of the second end of the pedal arm when the pedal arm is displaced from the operating position to the safety position to a second bracket position relative the pedal arm. In the safety position the pedal arm is in connection with the rotation shaft via the pedal connection shaft and the bracket. In the safety position the bracket is in the second bracket position and may be locked relative the pedal arm, rotating with the pedal arm when the pedal plate is pressed by the driver's foot. As the pedal arm in the safety position is still in connection with the rotation shaft via the pedal connection shaft and the bracket, the pedal arm does not in the event of a collision come loose in the vehicle. Further, some force can still be exerted on the pedal arm in the safety position by pressing the pedal plate at the second end of the pedal arm. There is at least some displacement of the second end of the pedal arm in the safety position, i.e. there is a reduced stroke compared to when the pedal arm is in the operating position.

Under normal driving conditions the locking arrangement is in the locked state and the bracket in the first bracket position. In the event of a collision the locking arrangement is changed from the locked state to an unlocked state, the pedal arm being displaced from an operating position to a safety position. Locking the bracket relative the pedal arm in the first bracket position by means of the locking arrangement may be pure mechanical.

The change of the locking arrangement from a locked state to an unlocked state may be initiated by a collision as such, e.g. from the impact of a foot of a driver being located on the pedal plate, and/or from the deceleration of the vehicle, or when a safety arrangement is pushed rearwards in the vehicle i.e. towards the driver during the collision.

Alternatively, or in addition, an anti-collision system of the vehicle using collision sensors, e.g. camera, IR-camera, radar, lidar etc., may be used to detect that a collision may occur and to prepare the vehicle for the collision. To minimize injuries to persons in the vehicle and to the vehicle itself, based on such sensor signals, displacement of the pedal assembly from the operating position to the safety position may be performed. In other words, a detection of collision detected by a collision sensor may initiate a change of the locking arrangement from locked to unlocked state, which displaces the pedal arm from operating position to safety position.

The bracket may comprise a first and second bracket portion arranged on opposing sides of the first end of the pedal arm, a normal of a side of the pedal arm being substantially parallel with the rotation shaft, and the first and second bracket portions being connected to each other by a bracket connection member. The first and second bracket portions and the bracket connection member may be in one piece. Alternatively, the first and second bracket portions may be separate portions connected to each other through the bracket connection member.

The bracket connection member may be arranged on the back side of the first end of the pedal arm, a normal of the back side of the pedal arm being substantially perpendicular to the rotation shaft and pointing in the direction of displacement of the second end of the pedal arm when the pedal arm is displaced from the operating position to the safety position. When in the second bracket position, the bracket connection member may abut against the back side of the pedal arm. The displacement, i.e. the remaining pivoting function, of the pedal arm when pressing the pedal plate in the safety position may be controlled by the bracket connection member arranged on the back side of the first end of the pedal arm.

The bracket connection member may be a shaft connecting the first and second bracket portions. The shaft may have a circular, squared, rectangular or any other suitable cross section.

The first and second bracket portions may be provided with a respective through-hole to receive the rotation shaft, and the first and second bracket portions may be connected to the respective side of the pedal arm through the pedal connection shaft.

The pedal connection shaft may constitute projections on each side of the pedal arm to which projections the bracket portions may be connected.

The pedal connection shaft may constitute a through shaft through the pedal arm and the bracket portions may be connected to a respective end of the through shaft.

The locking arrangement may comprise an actuator, selected from a group of actuators comprising a pyrotechnical actuator, a mechanical actuator, an electrical actuator or any combination thereof, upon activation of which the locking arrangement changes from the locked state to the unlocked state.

The actuator may be connected to a collision sensor or any other sensor in the vehicle responding to a collision event.

The locking arrangement may comprise a first locking part arranged on a front side of the first end of the pedal arm, a normal of the front side of the pedal arm being substantially perpendicular to the rotation shaft and pointing in a direction substantially opposite to the direction of displacement of the second end of the pedal arm when the pedal arm is displaced from the operating position to the safety position, and a second locking part may be arranged to fixedly connect the bracket and the first locking part together, when the locking arrangement is in the locked state. When the locking arrangement is in the second state, the second locking part allows the bracket and the first locking part to be separated from each other. The second locking part may be completely removed or partially removed or changed in size, shape etc.

The actuator may be connected to the second locking part of the locking arrangement.

The first locking part of the locking arrangement and the bracket portions may be provided with recesses, grooves, slits or slots to receive the second locking part of the locking arrangement when in the locked state.

The through-hole of the respective bracket portion may have an area which is about the same size as a cross-sectional area of the rotation shaft. The size of the through-hole may be at most about 10% larger than the cross-sectional area of the rotation shaft and should not be as small as to hinder rotation of the bracket portion around the rotation shaft.

Alternatively, the through-hole of the respective bracket portion may have an area which is larger than a cross-sectional area of the rotation shaft, and wherein the through-hole may be provided with a restriction to hinder the bracket portions from moving, other than rotating, about the rotation shaft. The area of the through-hole may be 1.5 times larger, 2 times larger or 3 times larger than the cross-sectional area of the rotation shaft. The restriction may e.g. be a tapering, a protrusion etc.

DETAILED DESCRIPTION

In FIGS. 1 and 4-8 is shown a pedal assembly 1, such as a brake pedal assembly or a clutch pedal assembly, for a motor vehicle, e.g. a car, a bus, a truck, or a construction vehicle. In the event of a collision, the pedal arm 2 of the pedal assembly 1 is displaced from an operating position OP to a safety position SP, and a pedal plate 4 arranged on a second end 2b of the pedal arm 2 is moved forward relative to the driving direction of the vehicle (see e.g. FIG. 5), thereby minimizing injuries to the driver's feet if the pedal assembly moves towards the driver upon a collision.

Figure 1:
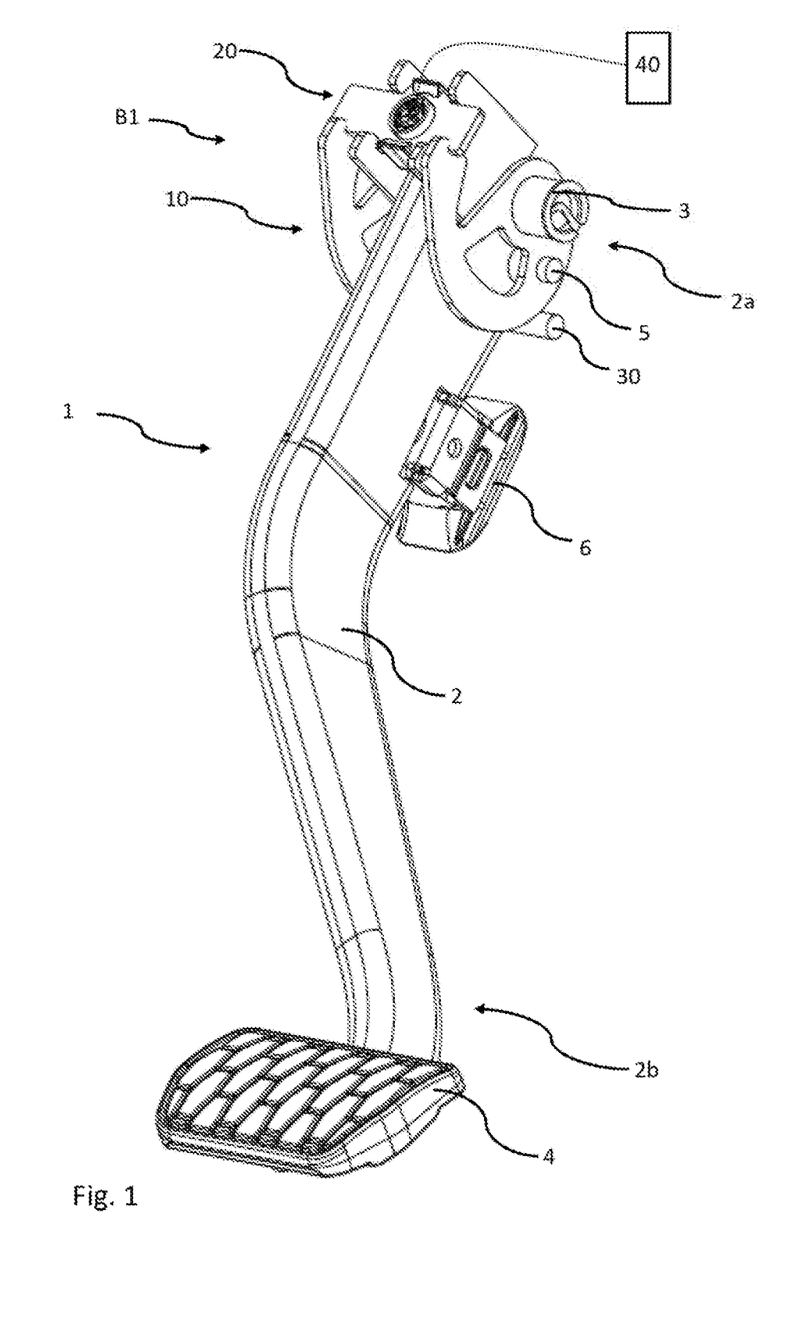
FIG. 1 shows a pedal assembly for a motor vehicle, the pedal assembly comprising a pedal arm, a bracket and a locking arrangement. The bracket being in a first bracket position, the locking arrangement being in a locked state and the pedal arm in an operating position.

A seen in e.g. FIG. 1 the pedal assembly 1 comprises the pedal arm 2 having a first 2a and a second end 2b. The second end 2b of the pedal arm 2 being provided with the pedal plate 4. The first end 2a of the pedal arm may be provided with a recess transversal to the direction of extension of the elongated pedal arm for receiving a rotation shaft, such that is pivotable about the rotation shaft 3 when the pedal arm is in the operating position OP, see e.g. FIG. 6. The rotation shaft 3, may be a rotation hub connected to the chassis of the vehicle.

Figure 2:
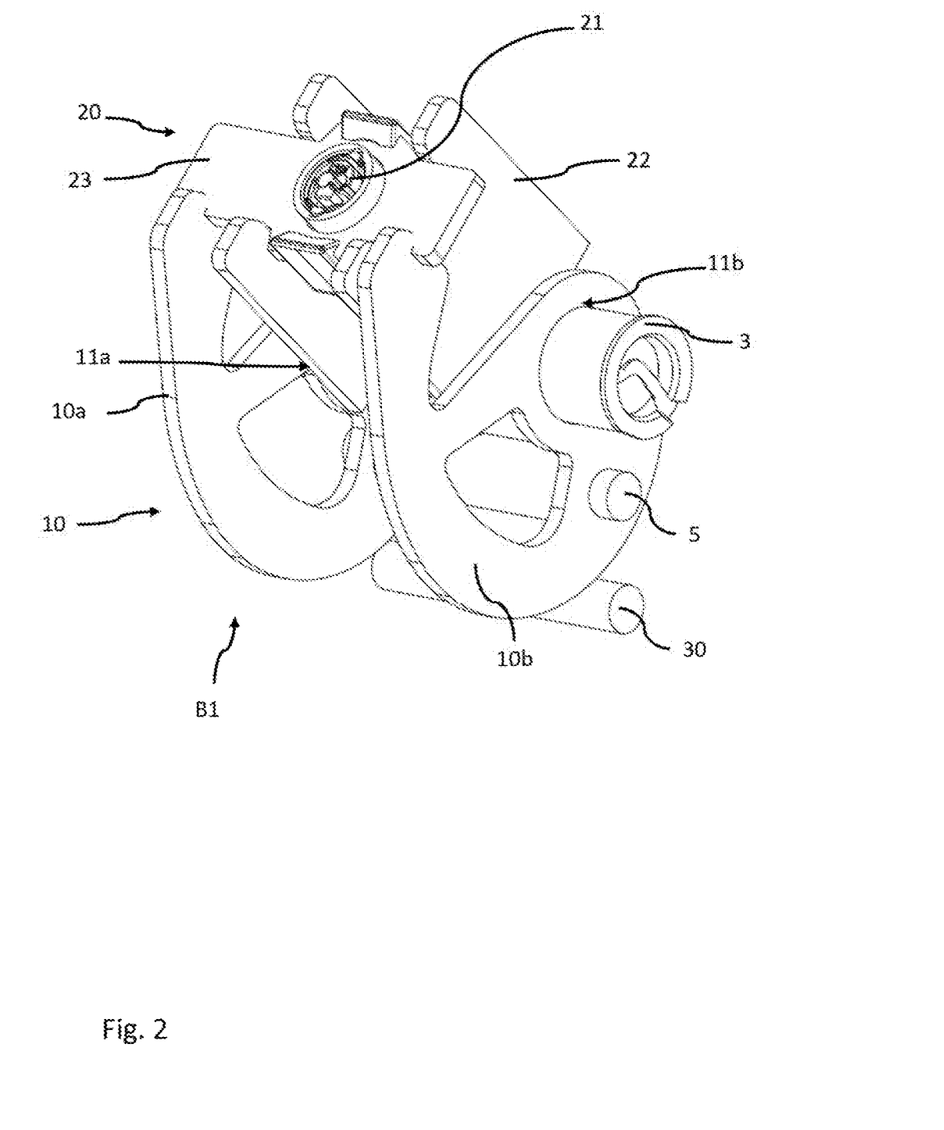
FIG. 2 is a magnification of the locking arrangement and the bracket shown in FIG. 1.
Figure 3:
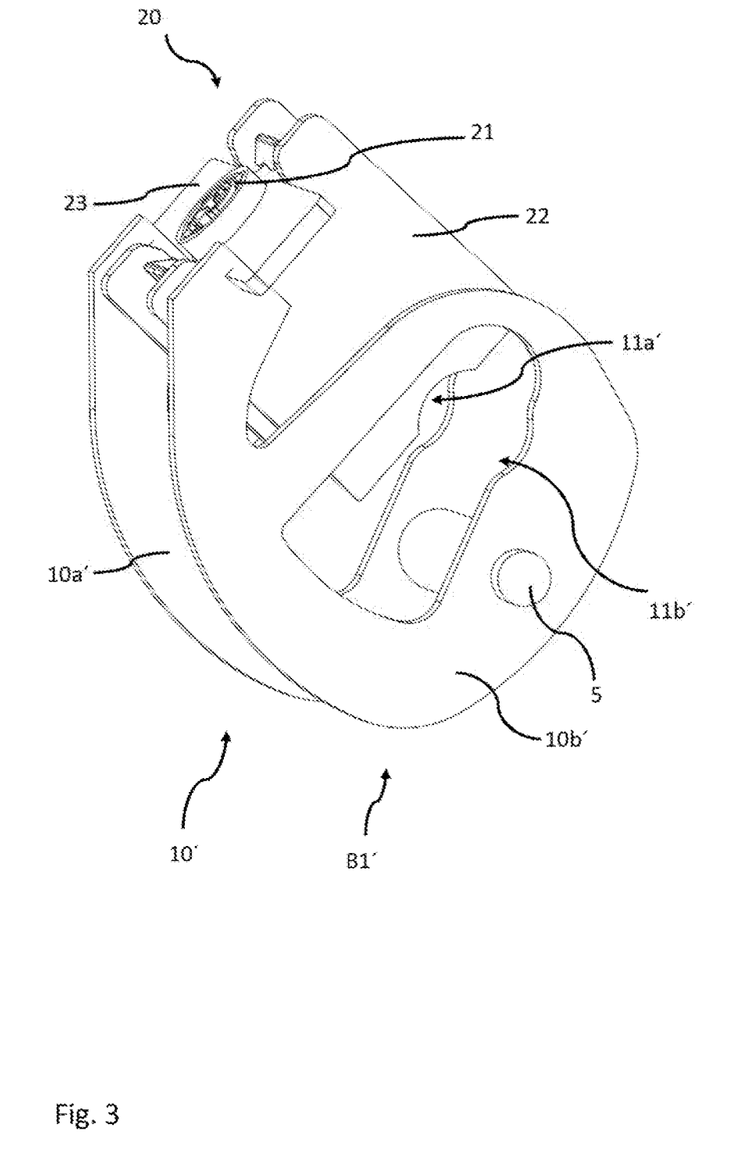
FIG. 3 is a magnification of the locking arrangement and a second embodiment of the bracket.

The pedal assembly 1 further comprises a bracket 10, 10' and a locking arrangement 20, which is shown more clearly in the magnifications in FIGS. 2 and 3. The bracket 10, 10' may be rotatably arranged around the rotation shaft 3 and connected to the first end 2a of the pedal arm through a pedal connection shaft 5. In FIG. 2 is shown a first embodiment of the bracket 10 and in FIG. 3 a second embodiment of the bracket 10'. Both bracket embodiments may comprise a first and second bracket portion 10a, 10b; 10a', 10b'', respectively, arranged on opposing sides of the first end 2a of the pedal arm 2. The first and second bracket portions 10a, 10b; 10a', 10b' may be connected to each other by a bracket connection member 30, 30', see e.g. FIGS. 1 and 8, arranged on the back side of the first end 2a of the pedal arm 2'. The bracket connection member 30, 30' may be a shaft connecting the first and second bracket portions 10a, 10b; 10a', 10b'.

The first and second bracket portions may be provided with a respective through-hole 11a, 11b; 11a', 11b' for connection to the rotation shaft 3. Through the connection to the rotation shaft 3, the bracket portions 10a, 10b; 10a'10b' are indirectly connected to each other. The bracket portions 10a, 10b; 10a',10b' may be connected to a respective side of the first end 2a of the pedal arm 2 through the pedal connection shaft 5.

The pedal connection shaft 5 may constitute projections on each side of the pedal arm 2 to which projections the bracket portions 10a, 10b; 10a', 10b' are connected. The pedal connection shaft 5 may constitute a through shaft through the pedal arm 2 and the bracket portions 10a, 10b; 10a', 10b'' may be connected to a respective end of the through shaft. The side brackets may be arranged with recesses or through holes to receive the pedal connection shaft 5. The pedal connection shaft 5 may be terminated with rivets.

The through-hole 11a,11b of the respective bracket portion 10a, 10b may have an area which is about the same size as a cross-sectional area of the rotation shaft 3. This embodiment of the bracket 10 is shown in the magnification in FIG. 2.

In FIG. 3 a second embodiment of the bracket 10' is shown having a through-hole 11a', 11b' in the respective bracket portion 10a', 10b', which is larger than a cross-sectional area of the rotation shaft 3. The rotation shaft is not shown in FIG. 3 but is shown in e.g. FIG. 2 for the first embodiment of the bracket 10. Such a through-hole 11a', 11b' may be provided with a restriction, e.g. a tapering, a protrusion etc, to hinder the bracket portions 10a', 10b' from moving, other than rotating, about the rotation shaft 3.

The pedal assembly 1 further comprises a locking arrangement 20. When the locking arrangement 20 is in a locked state, see e.g. FIGS. 1, 2, 3 and 6, the locking arrangement 20 locks the bracket 10, 10' in a first bracket position B1, B1" relative the pedal arm 2 such that the bracket 10 rotates with the pedal arm 2 when the pedal arm 2 pivots about the rotation shaft 3, see FIG. 6. When the locking arrangement 20 is in the locked state the pedal arm 2 is held in an operating position OP (FIGS. 1 and 6). Under normal vehicle driving conditions the locking arrangement 20 is in the locked state, the bracket 10,10' in the first bracket position B1, B1' and the pedal arm 2 in the operating position OP. In the event of a collision, the locking arrangement 20 is changed from the locked state to an unlocked state, see FIG. 4. The change of the locking arrangement 20 from a locked state to an unlocked state may be initiated by a collision as such, e.g. from the impact of a foot of a driver being located on the pedal plate 4, and/or from the deceleration of the vehicle, or when a safety arrangement is pushed rearwards in the vehicle i.e. towards the driver during the collision. Alternatively, or in addition, an anti-collision system of the vehicle using collision sensors 40 (see FIG. 1) may be used to detect that a collision may occur and to prepare the vehicle for the collision. To minimize injuries to persons in the vehicle and to the vehicle itself, based on such sensor signals, displacement of the pedal assembly 1 from the operating position OP to a safety position SP may be performed (FIG. 5).

Figure 4:
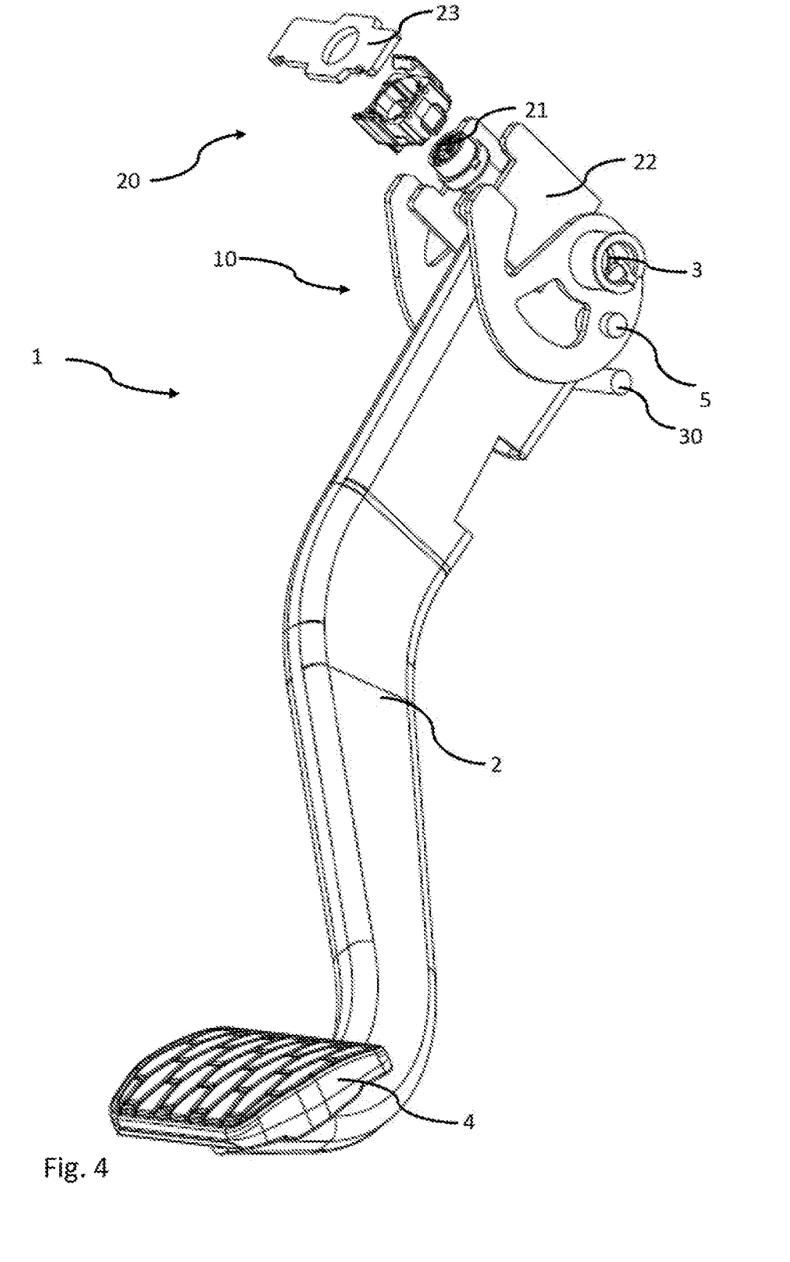
FIG. 4 shows the pedal assembly when the locking arrangement is changing from a locked state to an unlocked state.
Figure 5:
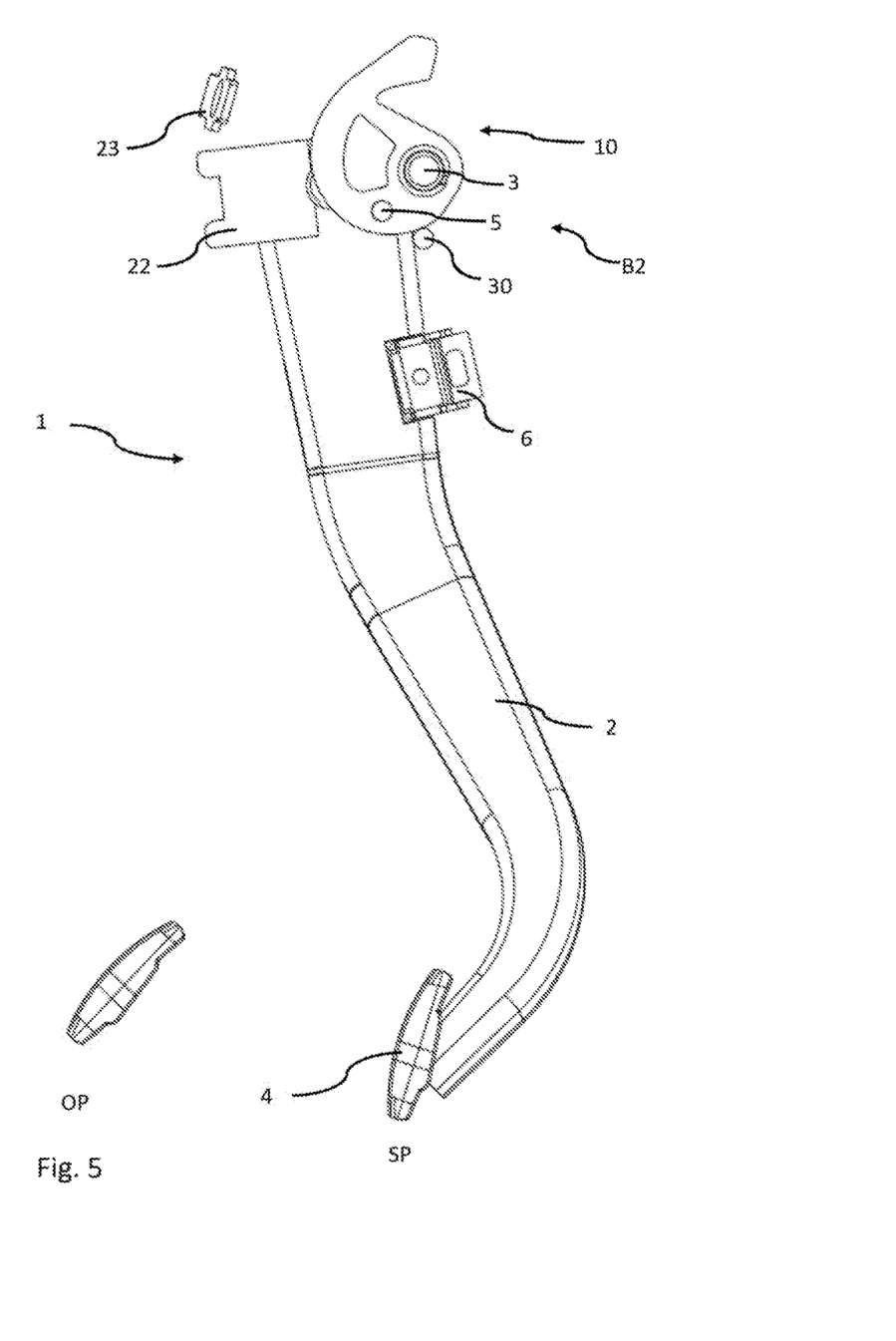
FIG. 5 shows the pedal assembly with the locking arrangement being in an unlocked state, the bracket being in a second bracket position and the pedal arm in a safety position.
Figure 6:
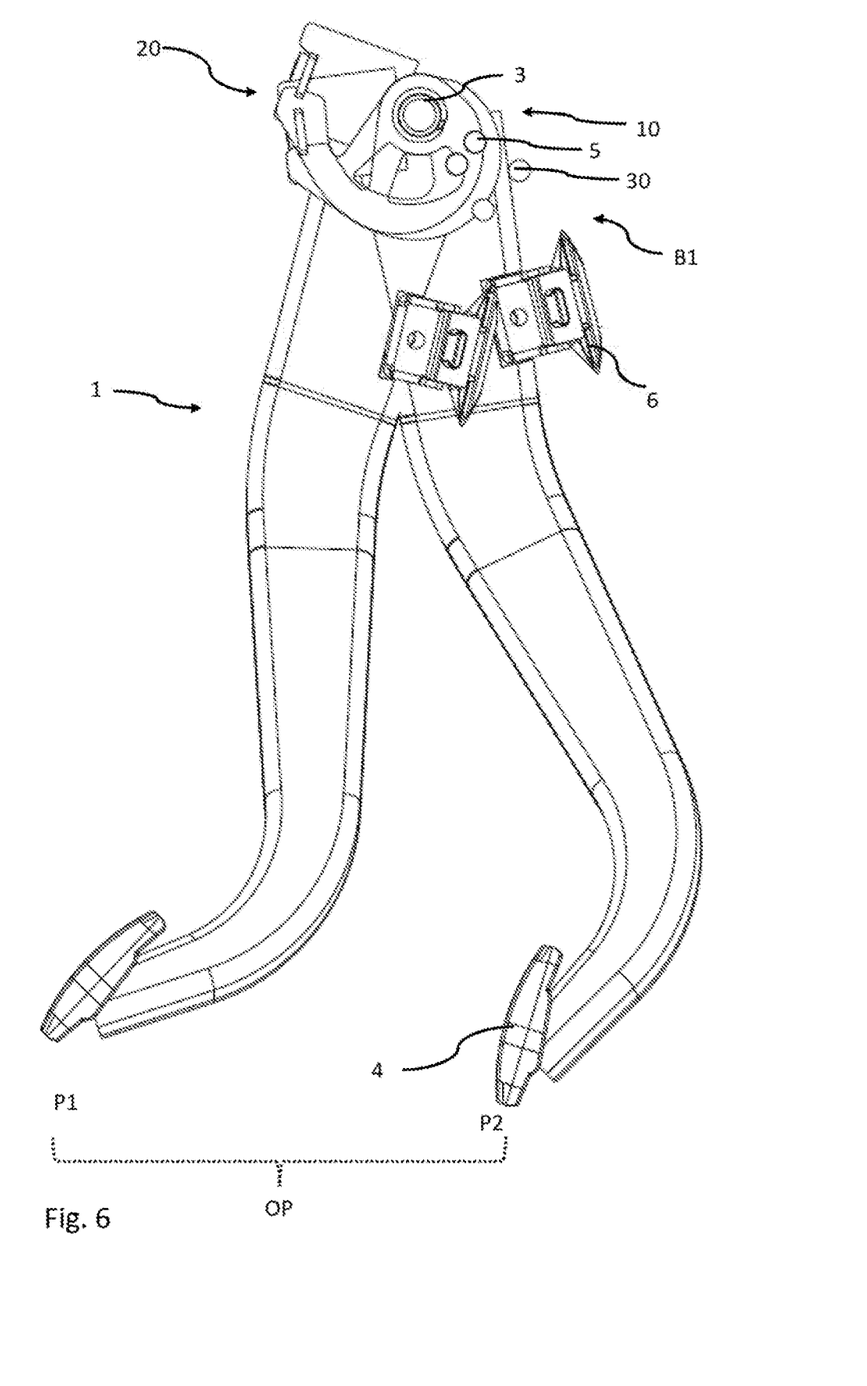
FIG. 6 shows the pedal assembly when the pedal arm is in an operating position and a pedal plate is being pressed from a start position to a bottom position.
Figure 7:
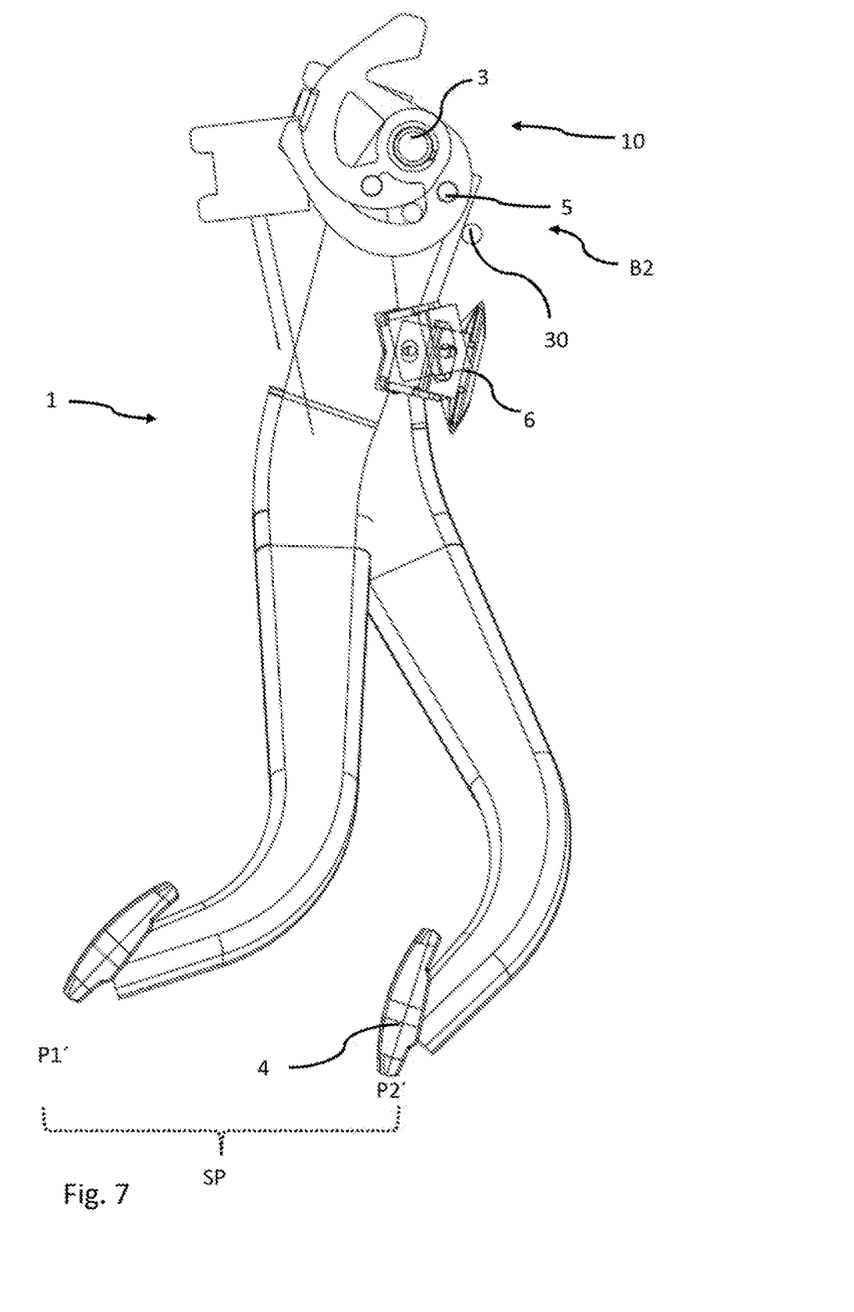
FIGS. 7 and 8 show the pedal assembly when the pedal arm is in a safety position and a pedal plate is being pressed from a start position to a bottom position. The bracket shown in FIG. 7 being the same bracket as shown in FIG. 2 and the bracket shown in FIG. 8 being the second embodiment of the bracket shown in FIG. 3.
Figure 8:
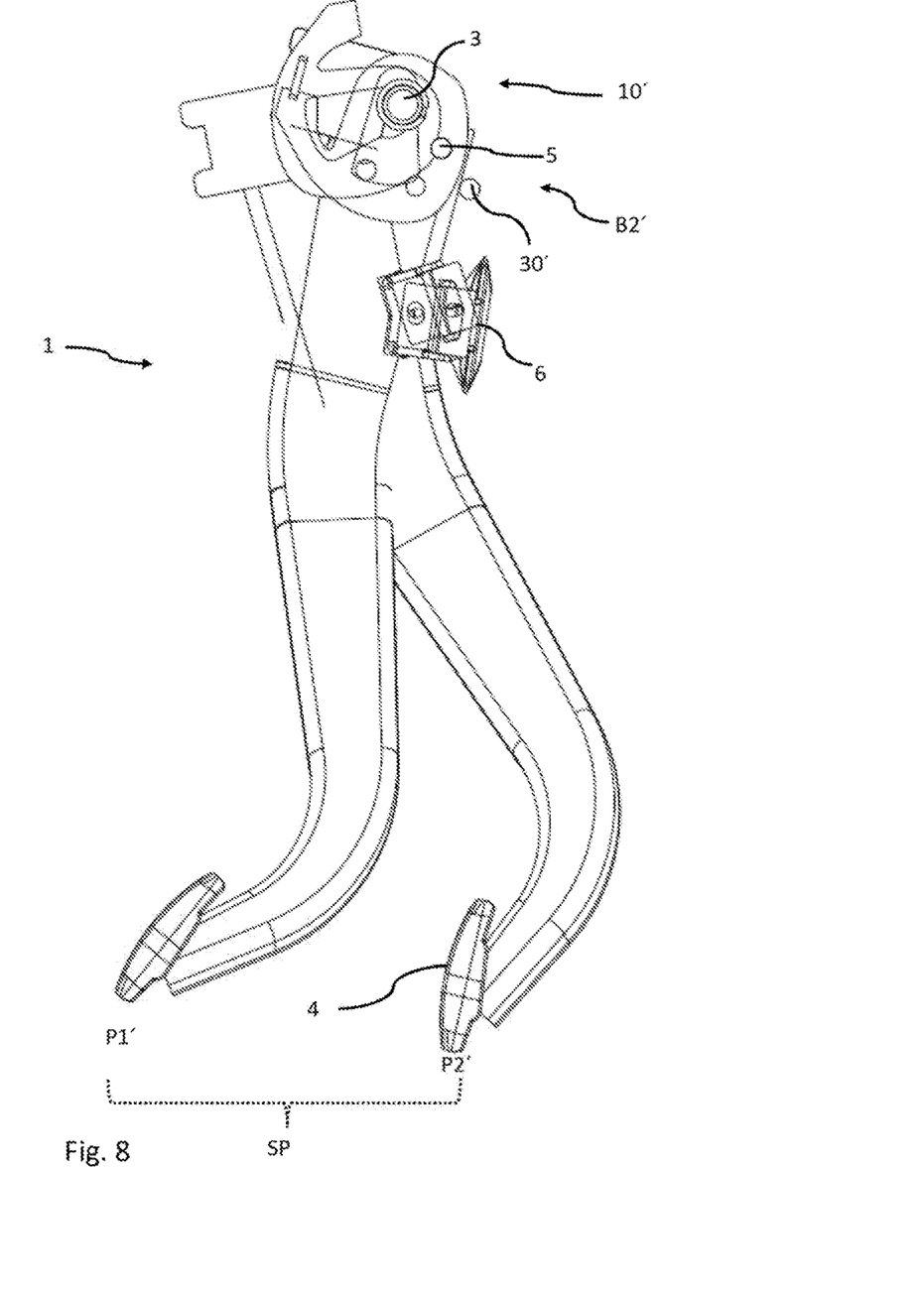

When the locking arrangement 20 is changing from the locked state to an unlocked state, the bracket 10, 10' is unlocked from the pedal arm 2 such that, under influence of gravity, the pedal arm 2 is released from the rotation shaft 3 and displaced from the operating position OP to the safety position SP, wherein the first end 2a of the pedal arm 2 is connected to the rotation shaft 3 via the pedal connection shaft 5 and the bracket 10, 10' (see FIGS. 4 and 5). The bracket 10, 10' is rotated relative the pedal arm 2 about the rotation shaft 3 and the pedal connection shaft 5 in a direction substantially opposite to the direction of displacement of the second end 2b of the pedal arm 2 when the pedal arm 2 is displaced from the operating position OP to the safety position SP to a second bracket position B2, B2'. In FIG. 4 the locking arrangement 20 is about to leave the locked state and enter an unlocked state, and in FIGS. 5, 7 and 8 is illustrated a bracket 10, 10' in the second bracket position B2, B2' and the second end 2b of the pedal arm 2 has been displaced from the operating position OP to the safety position SP.

In the operating position OP the pedal arm 2 is positioned for normal use, e.g. braking or clutching, by the locking arrangement 20, which is in the locked state. When the locking arrangement 20 is in the locked state, the bracket 10, 10' is fixed relative the pedal arm 2 and does not rotate relative the pedal arm 2 but rotates with the pivoting pedal arm 2. In the operating position OP the second end 2b of the pedal arm 2 is moveable between a first position P1 and a second position P2 by pressing, e.g. by a driver's foot, the pedal plate 4 in a direction forward relative the driving direction of the vehicle.

The safety position SP is a position where the second end 2b of the pedal arm 2 and the pedal plate 4 have been displaced away from the legs/feet of the vehicle driver as compared to when in the operating position OP (FIG. 5). In the safety position SP, the pedal arm 2 has been released from the rotation shaft 3 but the first end 2a of the pedal arm 2 is connected to the rotation shaft 3 via the pedal connection shaft 5 and the bracket 10, 10'. Thereby, the pedal arm 2 does not come loose in the vehicle in the event of a collision. When the bracket 10, 10' is in the second bracket position B2, B2' and the pedal arm 2 is in the safety position SP, the bracket 10, 10' may be locked relative the pedal arm 2 such that the bracket 10, 10' rotates with the movement of the pedal arm 2 when the pedal plate 4 is pressed in the safety position SP and the second end 2b of the pedal arm 2 displaced from a first position P1' towards a second position P2'.

The bracket connection member 30, 30' (see e.g. FIGS. 1 and 4-8) may abut/lie against the back side of the pedal arm 2 when the pedal arm 2 is in the safety position SP. In the safety position SP it is possible to displace the second end of the pedal arm 2b from a first position P1' to a second position P2' when pressing the pedal plate 4. This movement may be controlled by the bracket connection member 30, 30' (FIGS. 7 and 8). Compared to when the second end 2b of the pedal arm 2 is in the operating position OP and moveable between the first position P1 and the second position P2, there is a reduced stroke.

The locking arrangement 20 may comprise, as seen in FIGS. 2-4, a first locking part 22 arranged on a front side of the first end 2a of the pedal arm 2. A second locking part 23 may be arranged to fixedly connect, when the locking arrangement 20 is in the locked state, the bracket 10, 10' and the first locking part 22 together. When the locking arrangement 20 is in the unlocked state, the second locking part 23 allow the bracket 10, 10' and the first locking part 22 to be separated from each other. The second locking part 23 may be completely removed or partially removed or changed in size, shape etc., to allow the first locking part 22 to separate from the bracket 10, 10'. The first locking part may be welded to the first end 2a of the pedal arm 2. The first locking part 22 may alternatively be connected to the pedal arm 2 in any other suitable way. The first locking part 22 may alternatively constitute a portion of the pedal arm 2.

The first locking part 22 and the bracket portions 10a, 10b; 10a', 10b' may be provided with recesses, grooves, slits or slots to receive the second locking part 23.

The locking arrangement 20 may comprise an actuator 21, e.g. a pyrotechnical actuator, a mechanical actuator, an electrical actuator or any combination thereof. Upon activation of the actuator 21, which may be connected to the second locking part 23, the locking arrangement 20 changes from the locked state to the unlocked state wherein the first locking part 22 is separated from the bracket 10, 10', see FIG. 4. The actuator 21 may be connected to a collision sensor 40 (FIG. 1) or may be connected to any other sensor in the vehicle responding to a collision event, such that the collision event activates the actuator 21. The actuator 21 may be connected to the collision sensor 40 via e.g. a control unit (not shown) controlling the activation of the actuator 21 based on signals from the collision sensor 40.

The actuator 21 may be connected to the second locking part 23 by e.g. being integrated in the second locking part or releasably connected to the second locking part. The actuator 21 may change, remove, or move the second locking part. The actuator 21 may be connected to the second locking part 22 by e.g. a plastic guide.

An operating device may be connected to the pedal arm 2 and may be activated through movement of the second end 2b of the pedal arm 2 from a first position P, P' to a second position P2, P2' through pressing of the pedal plate 4, when in the operating position OP and safety position SP, respectively. The operating device may activate or control a vehicular function, such as a breaking function, a clutching function or the like. The operating device may be connected to the pedal arm 2 at a distance from the first 2a and second end 2b. In FIGS. 1 and 5-8 is indicated a connection point 6 for the operating device to the pedal arm 2. The operating device may activate or control a vehicular function, such as a breaking function, a clutching function or the like.

Although the description above contains a plurality of specificities, these should not be construed as limiting the scope of the concept described herein but as merely providing illustrations of some exemplifying embodiments of the described concept. It will be appreciated that the scope of the presently described concept fully encompasses other embodiments which may become obvious to those skilled in the art, and that the scope of the presently described concept is accordingly not to be limited. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for an apparatus or method to address each and every problem sought to be solved by the presently described concept, for it to be encompassed hereby. In the exemplary figures, a broken line generally signifies that the feature within the broken line is optional.

The invention claimed is:

1. A pedal assembly for a motor vehicle, comprising:
    an elongated pedal arm having a first end and a second end comprising a pedal plate, wherein when the pedal arm is in an operating position the pedal arm is pivotably arranged about a rotation shaft at its first end,
    a bracket, which is rotatably arranged around the rotation shaft and connected to the first end of the pedal arm through a pedal connection shaft, and
    a locking arrangement configured to,
    when in a locked state,
        lock the bracket in a first bracket position relative the pedal arm such that the bracket rotates with the pedal arm when the pedal arm pivots about the rotation shaft, and the pedal arm is held in the operating position, and when changing from the locked state to an unlocked state, unlock the bracket from the pedal arm such that, under influence of gravity, the pedal arm is released from the rotation shaft and displaced from the operating position to a safety position, wherein the first end of the pedal arm is connected to the rotation shaft via the pedal connection shaft and the bracket, and the bracket is rotated relative the pedal arm about the rotation shaft and the pedal connection shaft a direction substantially opposite to a direction of displacement of the second end of the pedal arm when the pedal arm is displaced from the operating position to the safety position to a second bracket position relative the pedal arm, wherein the locking arrangement comprises an actuator upon activation of which the locking arrangement changes from the locked state to the unlocked state, and the actuator is activated in response to a signal from a collision sensor or any other sensor in the vehicle responding to a collision event.

2. The pedal assembly of claim 1, wherein the bracket comprises, a first and second bracket portion arranged on opposing sides of the first end of the pedal arm, a normal of a side of the pedal arm being substantially parallel with the rotation shaft, and the first and second bracket portions being connected to each other by a bracket connection member.

3. The pedal assembly of claim 2, wherein the bracket connection member is arranged, on the back side of the first end of the pedal arm, a normal of the back side of the pedal arm being substantially perpendicular to the rotation shaft and pointing in the direction of displacement of the second end of the pedal arm when the pedal arm is displaced from the operating position to the safety position.

4. The pedal assembly of claim 2, wherein the bracket connection member is a shaft connecting the first and second bracket portions.

5. The pedal assembly of claim 2, wherein the first and second bracket portions are provided with a respective through-hole to receive the rotation shaft, and the first and second bracket portions are connected to the respective side of the pedal arm through the pedal connection shaft.

6. The pedal assembly of claim 5, wherein the pedal connection shaft constitutes projections on each side of the pedal arm to which projections the bracket portions are connected.

7. The pedal assembly of claim 5, wherein the pedal connection shaft constitutes a through shaft through the pedal arm and the bracket portions are connected to a respective end of the through shaft.

8. The pedal assembly of claim 5, wherein the through-hole of the respective bracket portion has an area which is about the same size as a cross-sectional area of the rotation shaft.

9. The pedal assembly of claim 5, wherein the through-hole of the respective bracket portion has an area which is larger than a cross-sectional area of the rotation shaft, and wherein the through-hole is provided with a restriction to hinder the bracket portions from moving, other than rotating, about the rotation shaft.

10. The petal assembly of claim 1, wherein the locking arrangement is selected from a group of actuators comprising a pyrotechnical actuator, a mechanical actuator, an electrical actuator or any combination thereof.

11. The pedal assembly of claim 8, wherein the locking arrangement comprises a first locking part arranged on a front side of the first end of the pedal arm, a normal of the front side of the pedal arm being substantially perpendicular to the rotation shaft and pointing in a direction substantially opposite to the direction of displacement of the second end of the pedal arm when the pedal arm is displaced from the operating position to the safety position, and a second locking part arranged to fixedly connect the bracket and the first locking part together, when the locking arrangement is in the locked state, and wherein the actuator is connected to the second locking part of the locking arrangement.

12. The pedal assembly of claim 1, wherein the locking arrangement comprises a first locking part arranged on a front side of the first end of the pedal arm, a normal of the from side of the pedal arm being substantially perpendicular to the rotation shaft and pointing in a direction substantially opposite toile direction of displacement of the second end of the pedal arm when the pedal arm is displaced ft the operating position to the safety position, and a second locking part arranged to fixedly connect the bracket and the first locking part together, when the locking arrangement is in the locked state.

13. The pedal assembly of claim 12, wherein the first locking part of the locking arrangement and the bracket portions are provided with recesses, grooves, slits or slots to receive the second locking part of the locking arrangement when in the locked state.

* * * * *